Nov. 15, 1932.  R. P. McLAUGHLIN  1,887,773
CLINOGRAPH
Filed June 28, 1929   4 Sheets-Sheet 1
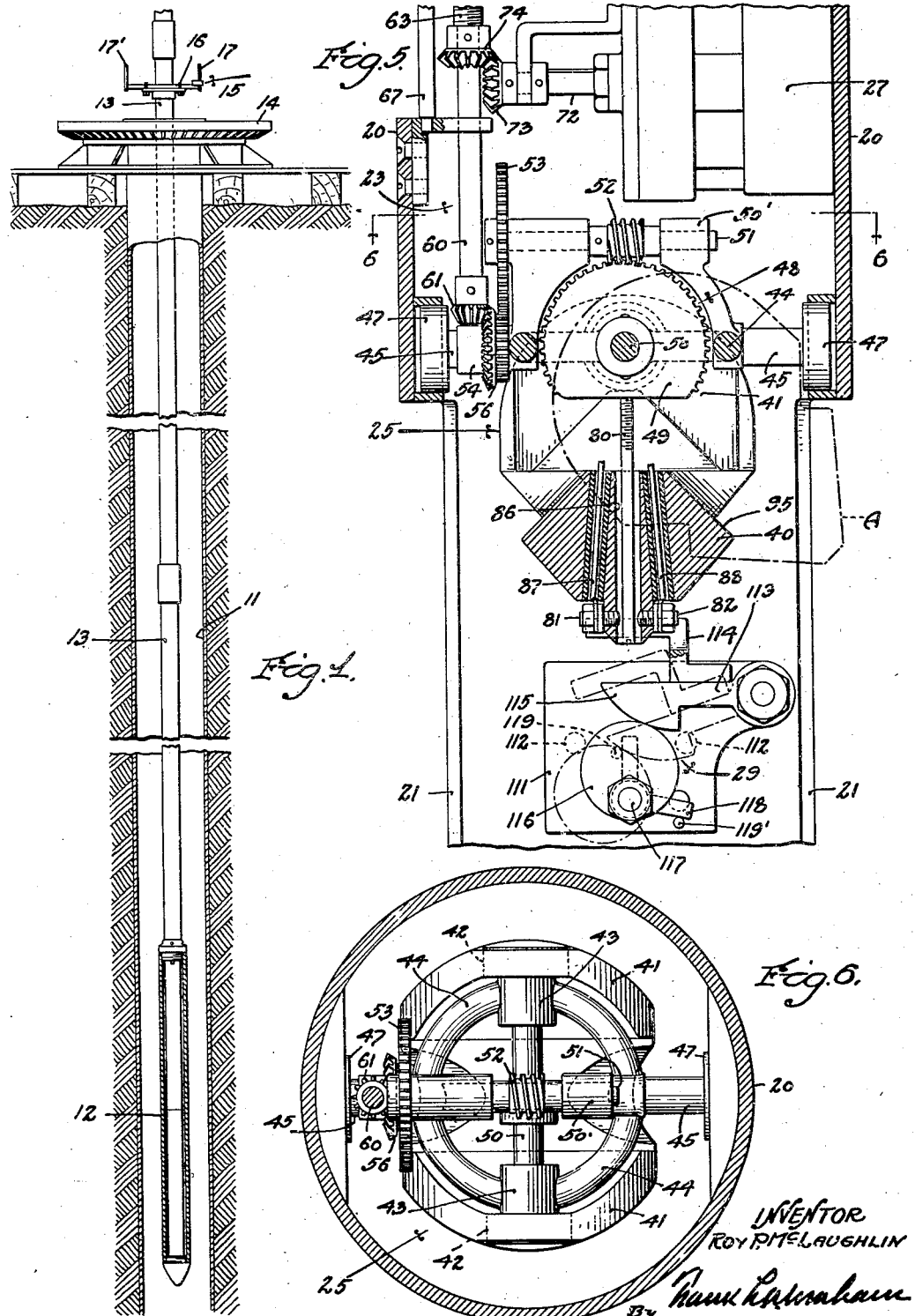

Nov. 15, 1932.    R. P. McLAUGHLIN    1,887,773
CLINOGRAPH
Filed June 28, 1929    4 Sheets-Sheet 2
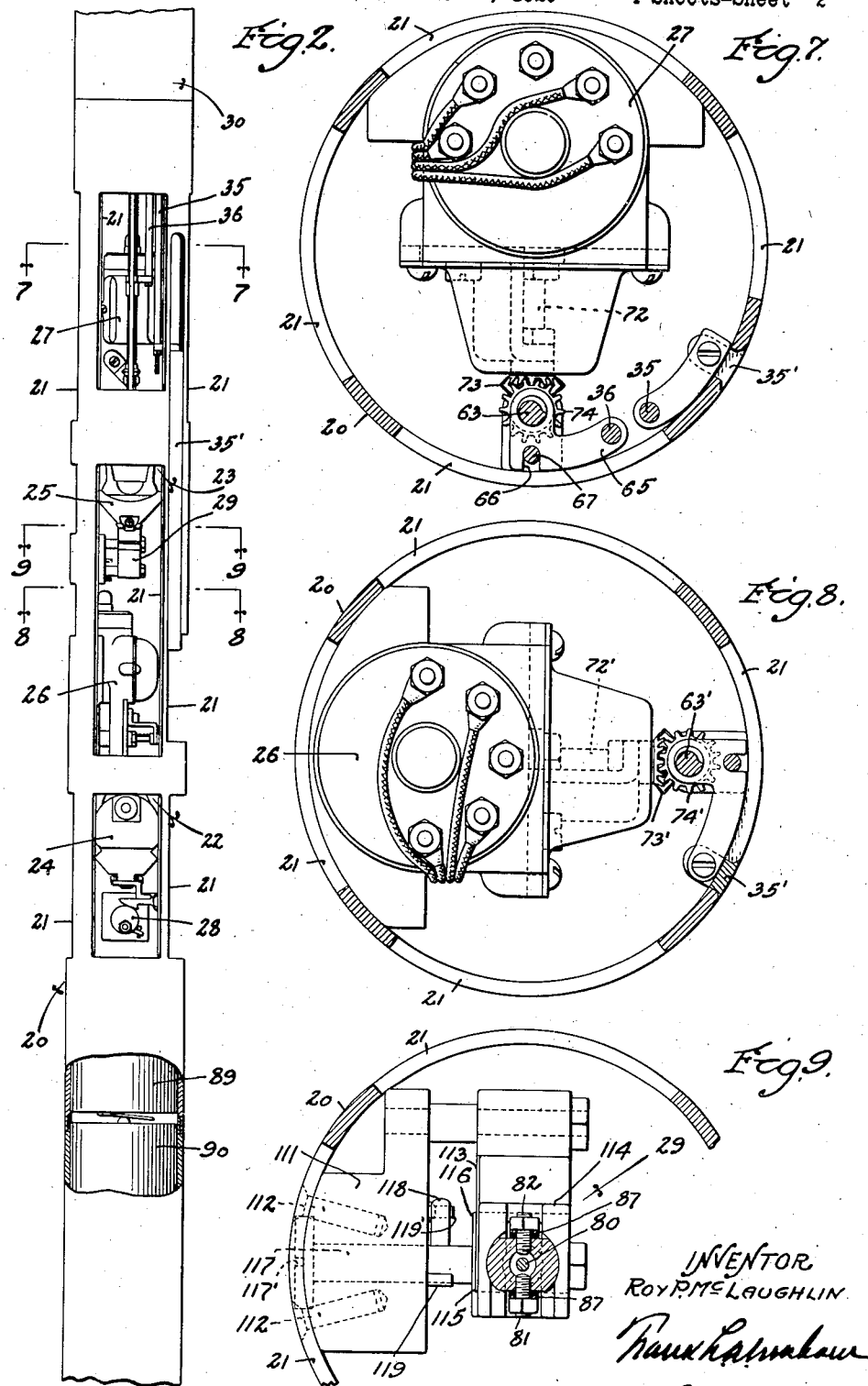
INVENTOR
ROY P. McLAUGHLIN
ATTORNEY

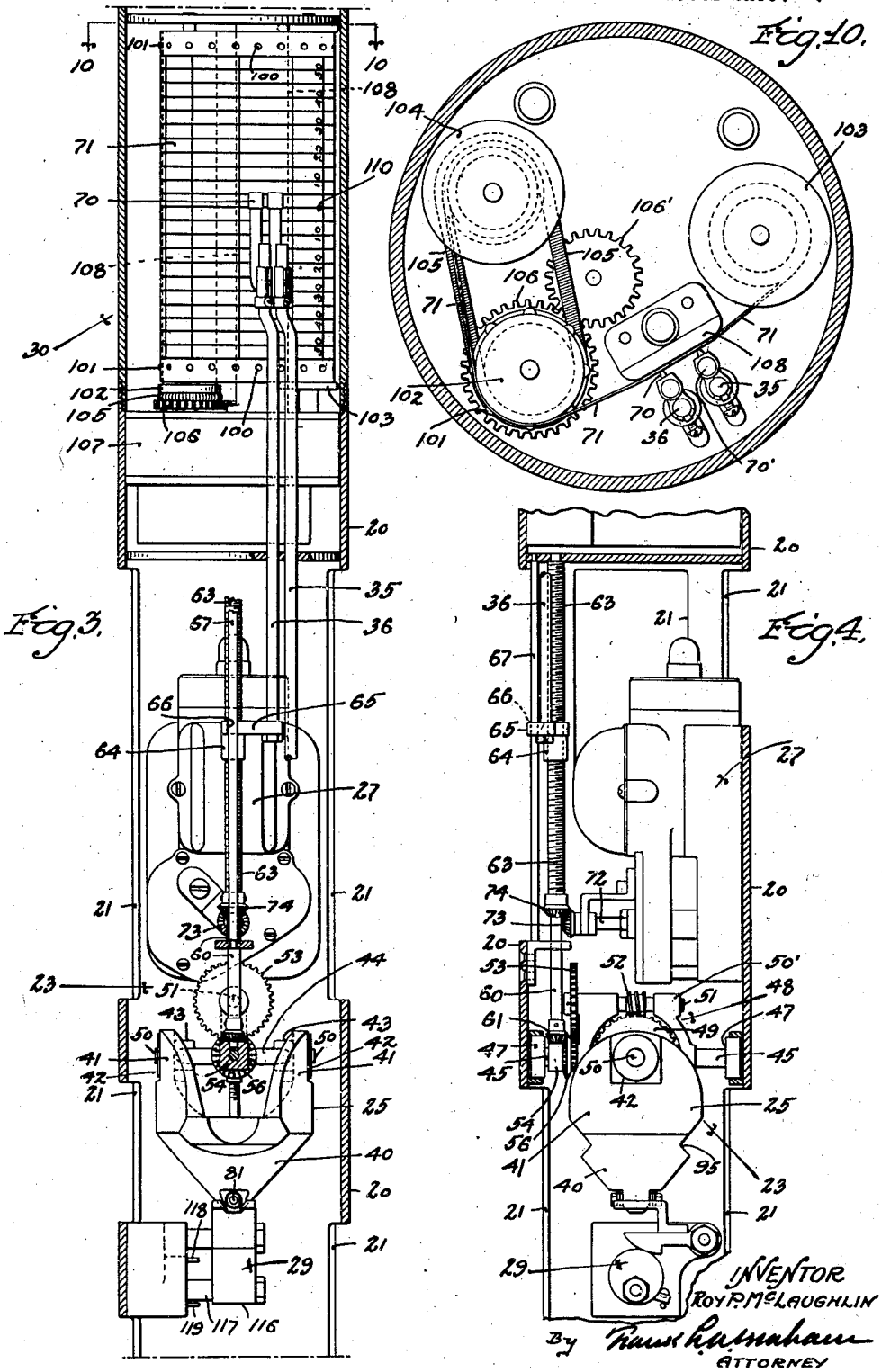

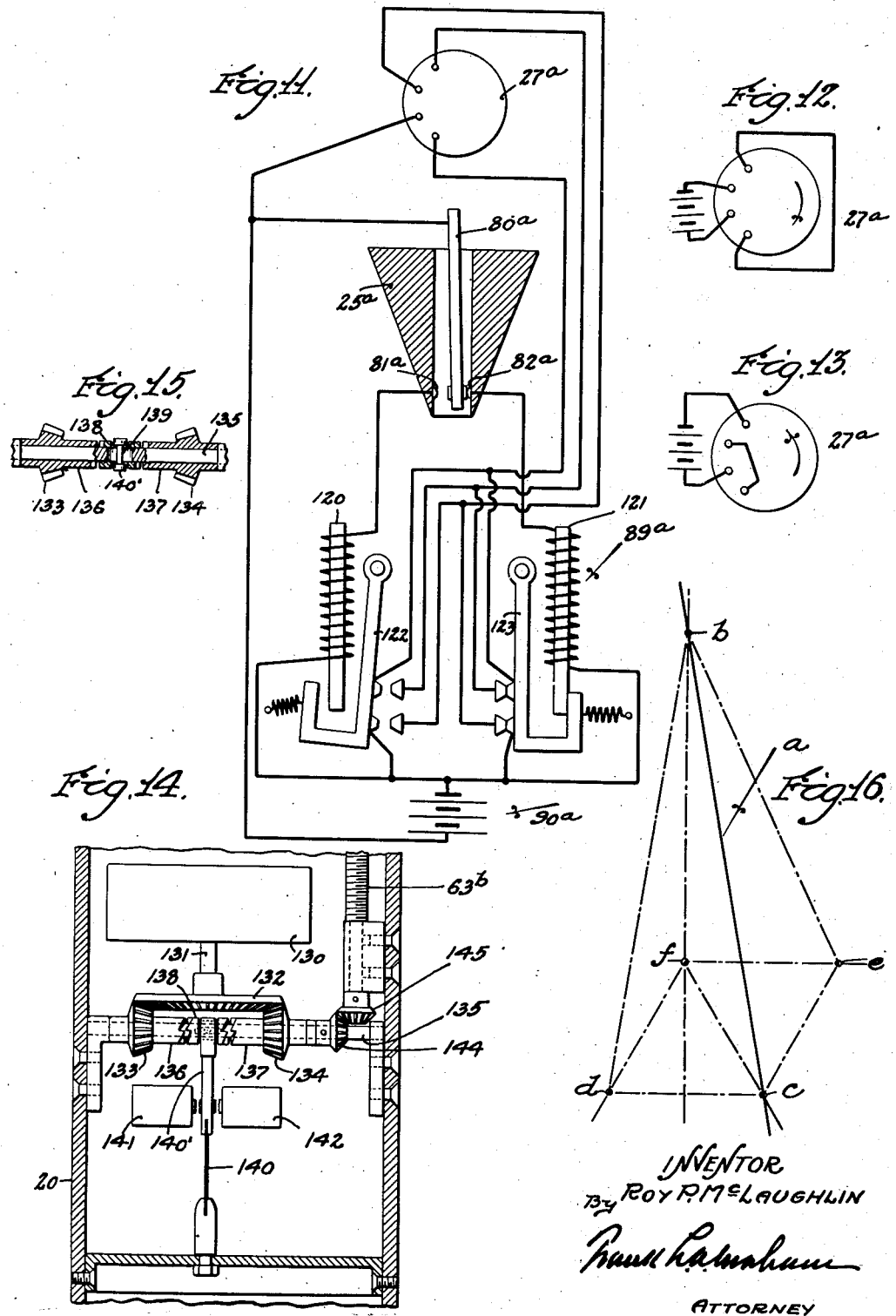

Patented Nov. 15, 1932

1,887,773

UNITED STATES PATENT OFFICE

ROY P. McLAUGHLIN, OF SOUTH PASADENA, CALIFORNIA

CLINOGRAPH

Application filed June 28, 1929. Serial No. 374,526.

This invention has to do with the art of surveying bore holes, and pertains more directly to a novel instrument which is hereinafter referred to as a clinograph, developed for the purpose of obtaining a graphic record of the deviation from the vertical of the bore hole throughout its entire depth.

I am aware of the fact that the art of surveying bore holes is not broadly new and that numerous instruments have been developed for this purpose. Such instruments include various modifications of the well known acid bottle and genatine bottle. There are other devices which depend for their operativeness upon the swinging movement of a pendulum or plumb bob mounted in a suitable casing which is adapted to be lowered into the bore hole.

In some of this latter class of instruments, means are provided for clamping the pendulums or plumb bobs at predetermined intervals in the bore hole, and in others, attempts have been made to obtain, either by photographic means or otherwise, a record of the declination of the pendulum or plumb bob at various points during the movement of the casing supporting the same into or out of the bore hole.

Some of the instruments which may be found in the prior art are adapted to be lowered into the bore hole by means of cables, and attempts have been made to obtain an indication of the movement of the instrument through the medium of electrical means at the surface of the ground.

The instrument contemplated by my invention may be broadly classified in that group of instruments in which the declination of the bore hole is obtained through the medium of pendulums or plumb bobs. The invention resides largely in certain improvements in this type of instrument whereby a graphic record of the movement of the instrument in the bore hole is obtained upon a single traveling sheet in a manner such that the accuracy of the results are far superior to the results contemplated by other devices of this general character.

The general construction of a preferred form of my invention embodies a casing within which a plumb bob or a plurality of plumb bobs or pendulums are mounted. The pendulums or plumb bobs are supported in the casing by means of gimbal rings, which are so constructed as to permit each of the plumb bobs to swing in two planes substantially at right angles to each other.

The plumb bobs are supported in predetermined angular relation with each other, and each plumb bob is provided with what I will hereinafter refer to as a governing or control member adapted to be moved in a single plane cooperatively with the movement of the plumb bob with which it is associated.

Each of the governing members is associated with a stylus member adapted to move longitudinally within the casing, such movement being proportional to the angular movement of the plumb bob with which the stylus member is associated. The stylus members are associated with the governing members in a manner such that each of the stylus members will be moved in opposite directions with respect to a properly chosen center line or neutral position when the corresponding pendulum is swung on opposite sides of axis of the casing.

The governing members and the stylus members are controlled by means of a suitable power unit which may be either an electric or spring motor. Each power unit is, in turn, adapted to be electrically controlled by means of a contact member which is associated with the corresponding governing member and is positioned between oppositely disposed contact points mounted upon the pendulum.

It is believed to be one of the foremost features of novelty of my invention that the stylus members referred to above are moved longitudinally within the casing. By moving the stylus members in this manner, it will be apparent that a record sheet of any desired width may be mounted within the casing in a manner such that it rotates upon axes which are parallel to the axis of the casing. The movement of the stylus members may be magnified so that the inclination of each pendulum from the axial line of the casing may be recorded upon the record sheet with extreme accuracy.

It is entirely possible, and it would be a comparatively simple matter to provide a pendulum or a plurality of pendulums or plumb bobs with stylus members or pens mounted directly upon the pendulums and adapted to swing therewith. Such a construction, if adapted to use in a clinograph, would obviously place a very narrow limitation upon the width of record sheet and would also limit the swinging movement of the pendulum to such an extent that the operativeness of such a device in measuring declinations exceeding from 15 to 20° would be questionable.

I have therefore avoided the possibilities of inaccuracies which might accrue from such a construction by producing a clinograph in which the pendulums are permitted to have maximum movement, and in which such movement may be magnified to any desired degree of accuracy.

Another noteworthy feature of my invention resides in the novel manner in which the pendulums used in my clinograph are constructed. This feature of the invention will be more fully described hereinafter where it will be noted that the pendulums are mounted in a manner such that they will swing through arcs of substantially 42° on either side of the axis of the casing.

It was mentioned above that the movement of the so called stylus and pendulum governing member was controlled through the medium of electrical contacts interposed between the governing member and the pendulum.

It is a further object of my invention to produce a novel type of electric contact means of the class described, whereby I am able to develop great sensitivity in the instrument and consequently obtain results of extreme accuracy in its operation.

In order to survey the course of underground passages, it is necessary to determine both the vertical and horizontal position of points in the passage with respect to the opening. So far as I am aware, all of the observations obtained by instruments now in use, are recorded as angular measurements in vertical and horizontal planes. These angular measurements, commonly known as "dip" and "bearing" are then used in conjunction with distances measured between the several points of observation to compute the relative positions of the points of observation.

The results of such computations are usually stated in terms of rectangular or cubic coordinates. For example, one point may be described as being 5' north, 10' each, and 20' vertically below another point. The above described usual method involves considerable work and computation in reducing the observed bearings and dips to the comprehensible and useful coordination. Furthermore, there are many opportunities for error in making such computations, and they can be made only by a person skilled in the art.

In the use of my invention I propose to use a novel form of recording sheet which is so calibrated in connection with the characteristics of the instrument in which the sheet is to be used as to present a finished record in which the declination of the bore hole, instead of being recorded in angular measurements as is ordinarily done, is recorded as the horizontal projected distance of a point in the bore hole with respect to a predetermined vertical line of reference.

As a specific example, I propose to graduate the record sheet so that each graduation thereon at either side of the central line thereof corresponds to a linear foot measured horizontally in a vertical plane parallel to one of the planes within which the plumb bob is swinging and in a horizontal plane which is positioned say eighty-eight feet or the length of one span of tubing below a predetermined point on the tubing. In other words, the observations are recorded directly as horizontal components of measured segments of bore. It is, therefore, a further object of my invention to produce a novel method of recording the course of a bore hole during a survey thereof.

Other advantageous features of the instrument embodying my invention, and further objects attending its production will be better understood from the following description of the accompanying drawings, which are chosen for illustrative purposes only, and in which Fig. 1 is a sectional elevation which may be considered as having been taken through a bore hole showing an embodiment of my invention suspended therein.

Fig. 2 is an elevational view illustrating a preferred combination and arrangement of elements embodied in my invention.

Fig. 3 is an elevational view, partly in section, showing the details in the construction of a preferred embodiment of my invention.

Fig. 4 is a partial elevational view similar to Fig. 3, but taken substantially at right angles to the view shown in Fig. 3.

Fig. 5 is an enlarged sectional elevation of a preferred form of pendulum and pendulum governing means used in combination with my invention.

Fig. 6 is a plan section which may be considered as having been taken in a plane substantially along the lines 6—6 in Fig. 5.

Fig. 7 is an enlarged plan section which may be considered as having been taken substantially in a plane represented by the lines 7—7 in Fig. 2.

Fig. 8 is a plan section similar to Fig. 7, but taken in a plane represented by the lines 8—8 in Fig. 2.

Fig. 9 is a partial plan section taken in a plane represented by the line 9—9 in Fig. 2.

Fig. 10 is a plan section which may be considered as having been taken substantially in a plane represented by the line 10—10 in Fig. 3.

Fig. 11 is a wiring diagram of the preferred form of circuit used in the operation of my invention.

Fig. 12 is a wiring diagram illustrating the electric connections for imparting movement to the pendulum governing member in one direction.

Fig. 13 is a wiring diagram similar to Fig. 12, showing the electrical connections used in imparting movement to the pendulum governing member in the opposite direction.

Fig. 14 is a partial sectional elevation illustrating a modified form of power unit which may be used in my invention.

Fig. 15 is a partial section showing details in the construction of the control clutch shown in Fig. 14, and Fig. 16 is a diagram which will be used to illustrate the manner in which a bore hole is surveyed by the method contemplated in my invention.

More particularly describing my invention as herein illustrated, reference numeral 11 indicates a bore hole within which a clinograph 12 is suspended by means of a tubing 13.

The tubing 13 is illustrated as extending downward through a rotary table 14, and the upper end thereof is provided with an orienting device generally indicated by reference numeral 15.

It is to be understood that the tubing 13 may be oriented in any well known manner, such as has been frequently used in the practice of obtaining core samples, and that the member 15 is simply a preferred form of apparatus which I have devised for this purpose.

The member 15 consists of a supporting bar 16, which is clamped into the tubing 13 and is provided with oppositely disposed sight members 17 and 17' arranged in alignment and positioned in predetermined relation with a suitable mark upon the tubing 13 which, in turn, bears a predetermined relation to the position of the pendulums within the clinograph 12.

In the use of the instrument, the tubing may be lowered into the well, so that all of the marks thereon always bear the same relation to the bar 16, and the bar 16 may be maintained in the same relative position during the movement of the tubing into the well by adjusting the sights 17 and 17' so that they are always in alignment with a preselected point of reference.

This procedure is believed to be well known to those familiar with the art, and it will be understood that other means may be employed for maintaining the clinograph 12 in oriented position during its movement into the bore hole. It is entirely possible that gyroscopic means may be developed for the purpose of orienting the clinograph, and in the event such means were used, the necessity of orienting the tubing would be dispensed with. It is also possible to operate the clinograph without maintaining it in the same oriented position; for instance, the tubing may be lowered into the hole and the degree of rotation observed and recorded from suitable graduations upon the member 15.

The details in the construction of a preferred form of my invention are best illustrated in Figs. 2 to 13, inclusive. With particular reference to Fig. 2, it will be noted that the clinograph comprises a casing 20, shown as being provided with a plurality of apertures generally indicated by reference numeral 21. The apertures are so formed and so positioned as to facilitate the examination and the adjustment of the elements contained within the casing.

Mounted within the casing in predetermined spaced relation with each other, I show two pendulum units, generally indicated by reference numerals 22 and 23. These pendulum units comprise pendulums 24 and 25, power means in the form of motors 26 and 27, and pendulum locking means generally indicated by reference numerals 28 and 29.

Mounted in the top of the casing 20, I provide recording means which are enclosed within the upper portion of the casing at a point generally indicated by reference numeral 30. Each of the pendulums and the power means are associated through the medium of so called governing means (the details of which will be hereinafter more fully described with longitudinally moving stylus supporting members, indicated in Figs. 2 and 3 by reference numerals 35 and 36.

The operation of the stylus supporting members 35 and 36 by means of the respective pendulums will be best understood from the following description of the details in the construction of one of the pendulum members and its associated parts. Suffice it to say at this time, that each of the pendulums 24 and 25 is supported in a manner such that it will swing in two planes which are substantially normal to each other, and that each of the pendulums is provided with a so called governing member which controls the movement of the pendulums in one of said planes. The governing members are, in the form shown, arranged substantially at 90° or other predetermined angle with each other so that the controlled movement of the two pendulums occur in planes which are normal to each other. Consequently, the movement of each of the stylus supporting members 35 and 36 is proportional to the projected angular position of the casing in planes which are normal to each other.

In order that the movement of the pendulums may be recorded upon a single sheet or chart, it is necessary to use a slidable connecting bar 35′, which is interposed between the lower pendulum unit 22 and the stylus member 35. The construction and position of the bar 35′ is clearly shown in Figs. 7 and 8.

Reference is now made to Figs. 3 to 6, inclusive, which illustrate the details in the construction of the pendulum unit 23 and its associated parts. Before entering into the description of this construction, it is pointed out that the unit 23 is identical with the unit 22, except for the fact that it is positioned substantially at right angles to the position of the unit 22, and for this reason corresponding parts in unit 22 will be indicated by the same reference numerals used in describing the unit 23, except that the numerals used in connection with unit 22 will be distinguished with the prime mark.

Referring now to Fig. 3, it will be noted that the plumb bob 25 comprises a main body 40 and upwardly extending and oppositely disposed ears 41.

The ears 41 are provided with bearing members 42, which preferably receive roller bearings adapted to support trunnions 43, formed upon a ring 44.

The ring 44 is provided with trunnions 45, positioned upon an axis which is at right angles to the common axis of the trunnions 45, and is supported by means of bearings 47.

It will be noted that this construction forms, in effect, a gimbal ring, in which the pendulum is free to swing in planes which are substantially normal to each other, each of the planes within which the pendulum swings containing one of the axes of the trunnions.

Pendulum governing means, generally indicated by reference numeral 48, are mounted above the pendulum 25. Such governing means are illustrated as comprising a governing member in the form of a worm wheel 49, mounted upon a shaft 50, which is rotatably mounted within the ring 44.

A worm support 50 is mounted upon the top of the ring 44 in parallel relation with the trunnions 45, and this worm support carries a rotatable shaft 51, which, in turn, has a worm 52 keyed thereon. The worm 52 is in engagement with the worm wheel 49. The outer end of the shaft 51 is provided with a gear wheel 53.

A bearing block 54 is illustrated as being rotatably mounted upon one of the trunnions 45, and this bearing block carries a rotatable combination spur and beveled gear 56.

The spur gear of the combination gear 56 is in mesh with the gear 53, so that any movement of the gear 56 will be effective through the medium of the gear 53 to rotate the worm 52 and consequently impart rotation to the worm wheel 49.

A vertical screw shaft 60 is illustrated as having its lower end rotatably mounted in the bearing block 54, and is provided at that point with a beveled pinion 61, which is in mesh with the beveled portion of the combination gear 56.

The upper portion of the screw shaft 60 is provided with a screw or threaded portion generally indicated at 63. The threaded portion 63 carries an internally threaded collar 64.

The threaded collar 64 is provided with an arm 65, having a notch 66 thereon, which travels over a guide member 67, holding the collar 64 against rotation with the screw shaft 60. From this construction it will be apparent that the rotation of the shaft 60 is effective to impart synchronous rotation to the worm wheel 49 and longitudinal movement to the collar 64.

The arm 65 on the collar 64 carries the stylus supporting member 36 referred to above. The upper end of the stylus supporting member is provided with a stylus or pen 70, adapted to engage a traveling sheet or chart 71.

For the purpose of imparting rotation to the shaft 60 and permitting consequent angular movement of the pendulum 23 and effecting synchronous longitudinal movement of the collar 64, I provide power means generally indicated by reference numeral 27, which, in the form of my invention shown in Figs. 2 to 13, inclusive, comprises a reversible electric motor.

The motor 26 is provided with a drive shaft 72, the outer end of which carries a beveled gear 73, in mesh with the corresponding beveled gear 74 that is keyed or otherwise rigidly mounted upon the shaft 60.

It will now be apparent that the pendulum 25 may be held against movement in the plane of the control member 49, and that the movement of the pendulum may be made effective through the movement of the control member 49 to impart longitudinal movement to the stylus member 70, such movement being proportional to the angular movement of the pendulum 25.

The means whereby this is accomplished are best illustrated in Fig. 5, where it will be noted that the control member or worm wheel 49 is provided with a downwardly extending contact bar 80, an extending portion of which is positioned between two oppositely disposed contact members 81 and 82, mounted upon the pendulum 25.

In the form illustrated, the pendulum 25 is provided with an axial passage 86, and the contact members 81 and 82 are mounted in the lower end thereof. While this may, from the description, be considered as a more or less optional construction, it is emphasized that this arrangement increases materially the sensitivity with which the unit operates.

The contact members 81 and 82 are connected through the medium of suitable conductors 87 and 88 with a relay indicated in Fig. 2 by reference numeral 89. This relay is in electrical contact with a battery 90 and is also connected with the reversible motors 26 and 27.

Assume now that the casing which carries the pendulum 25 is inclined slightly from the vertical in the plane of the paper. The tendency will be for the pendulum to assume a vertical position in the casing. Any movement of the pendulum with respect to the contact bar 80 will, however, result in a circuit being closed through one of the contact members 81 or 82, depending upon the direction in which the pendulum tends to swing. The flow of current established in such a circuit passing through the relay 89 will energize the motor 26 in a manner such that the shaft 60 is rotated so as to cause the contact bar 80 to follow the movement of the pendulum. The operation of the motor will continue until the pendulum has assumed a vertical position and the contact bar 80 has been moved out of engagement with the contact member 81 or 82 with which it was originally engaged. This movement is, of course, effective to impart a longitudinal movement to the stylus member which is proportional to the angular movement of the pendulum.

It has been previously pointed out in the specification as a noteworthy feature of my invention that the pendulum is formed so as to permit the largest possible swing thereof within the casing. This feature is best illustrated in Fig. 5, wherein it will be noted that the conical portion of the pendulum is formed on an angle such that this surface is substantially parallel to the inner wall of the casing when the pendulum has been swung to an extreme side position, as indicated in dot and dash lines at A.

The pendulum body is notched, as indicated at 95, to admit its passage past the bearing members 47.

It will be apparent from the foregoing description that, while the angular movement of the pendulum may be considered as being governed in one plane, the pendulum is free to swing upon trunnions 45 in a plane at right angles to the plane in which the movement is governed, and it will also be apparent that, while I have illustrated the invention in Fig. 2 as being provided with two pendulums arranged to have controlled swinging movement in planes substantially at 90° with each other, three or more pendulums may be arranged at angles other than 90°, and the readings on the chart 71 will then, of course, indicate the deviation of the instrument from the vertical in planes corresponding to the planes in which the respective pendulums swing.

It has also been pointed out as an important feature of my invention that the stylus members are adapted to be moved longitudinally within the casing, and it will be apparent that merely by changing the pitch of the screw threads on the screws 63, that the movement of the stylus members may be magnified to any desired extent to facilitate the interpretation of the results.

It is further pointed out, by way of emphasizing the accuracy of this instrument, that the worm and worm wheel 49 and 52 comprise what is, in effect, a micrometer adjustment for controlling the reproduction of the movement of the pendulum.

The construction of the means whereby the traveling sheet 71 is controlled is perhaps best illustrated in Figs. 3 and 10, wherein it will be noted that the sheet 71 is provided with edge perforations 100, which receive sprockets 101 formed upon opposite ends of a rotatable drive drum 102.

A magazine roll is provided at 103, and a take up roll is provided at 104, the take up roll being controlled by means of a belt or other well known means indicated at 105.

The drive drum 102 is adapted to be driven through the medium of gears 106 and 106' by means of a clock mechanism, generally indicated by reference numeral 107.

In the operation of my invention, the clock mechanism 107 carries the record sheet 71 over a back plate 108 beneath the stylus pins 70 and 70' at a predetermined speed, and the sheet is preferably provided, in the well known manner, with graduations indicating the time intervals during which the instrument was in operation.

The record sheet is also provided with a central or zero graduation 110. The graduations on both sides are so spaced and numbered with relation to the instrument characteristics as to indicate the latitude and departure of the instrument with respect to a predetermined vertical line, instead of the angular bearing and dip of the instrument.

Since the chart or sheet also carries a record of the time intervals during which it was passing beneath the pins, it will be apparent that, by keeping a record of the rate at which the instrument was lowered into the well, the latitude and departure of any point in the bore hole with respect to the bore hole opening can be readily determined by simple arithmetic, taking the values indicated on the chart in connection with the distance of the instrument below the ground surface at the particular interval of time for which the calculations are made.

In an instrument of this character, where the sensitivity of the instrument is dependent largely upon the position and adjustment of the contact members 81 and 82 (which are in the form of adjustable bolts) with respect to the contact bar 80, it is important that means be provided for locking the pendulums in a neutral position when the instrument is not in use. Although various locking means may be employed for this purpose, I have shown a preferred form of lock 29, which is positive in its operation, simple in construction, and may be easily operated with a screw driver or other similar instrument.

The details in the construction of the lock 29 are clearly illustrated in Fig. 5 as comprising a bearing block 111 attached to the inner surface of the casing 20 in any suitable manner, such as by means of screws 112. A cam lever 113 is pivotally mounted upon the block 111. The lever 113 is provided with a locking fork 114, which is adapted to engage the lower end of the pendulum when the lever is in the raised position shown in Fig. 5.

The cam lever 113 is provided with a cam surface 115, which is in engagement with an eccentric roller 116. The eccentric roller 116 is keyed to a rotatable pin 117, which extends through the wall of the casing 20. The extending end of the pin 117 is provided with a slotted head 117', whereby the eccentric roller may be turned from the full line position to the dot and dash line position shown in Fig. 5 for effecting a clamping or a releasing action of the plumb bob. For the purpose of placing a locking limitation upon the movement of the eccentric roller 116, the pin 117 is provided with an angularly extending stop arm 118, which engages two stop pins 119 and 119' mounted upon the inner surface of the bearing block 111.

In Figs. 11, 12 and 13 I show a preferred form of electrical system which I propose to use in combination with my invention. In these figures the pendulum is diagrammatically indicated by reference numeral 25a, the contact bar by reference numeral 80a, the relay by 89a, the battery by 90a, and the motor by 27a.

The two contact members 81a and 82a respectively, are connected to solenoids 120 and 121 in the relay, these solenoids being effective to operate switch members 122 and 123, which, in turn, control the reversal of current from the battery 90a through the motor 27a.

Figs. 12 and 13 illustrate the manner in which the current is reversed through the solenoid switches for the purpose of reversing the operation of the motor.

Figs. 14 and 15 illustrate one manner in which a spring or other mechanical driving device may be substituted for the electric motor which was described in connection with Figs. 2 to 13, inclusive. In this construction reference numeral 130 indicates a spring motor, the drive shaft 131 of which is provided with a beveled gear 132.

The gear 132 is in constant mesh with two oppositely disposed beveled pinions 133 and 134, which are rotatably mounted upon a shaft 135 and are provided with clutch collars 136 and 137, adapted to be engaged by a slidable clutch sleeve 138, which is slidably mounted upon the shaft 135 and is held against rotation relative thereto by means of a pin and slot connection indicated at 139.

The clutch sleeve 138 is adapted to be slidably moved upon the shaft 135 by means of a yoke arm 140, the angular movement of which is controlled by means of solenoids 141 and 142. The yoke arm 140 is held in a neutral position by means of a leaf spring 140'.

The shaft 135 is provided with a beveled gear 144, which is in mesh with a gear 145 that is keyed to the lower end of the stylus control screw 63b. This construction is adapted to operate in connection with a pendulum unit similar to that described in connection with Figs. 2 to 13, inclusive, the only difference being that the pendulum, instead of operating a relay which, in turn, controls the reversal of current through a motor, is effective to control the passage of current through one or the other of the solenoids 141 and 142.

The spring motor 130 is constantly rotating and the passage of current through either one of the solenoids will be effective to engage one of the other clutch collars 136 or 137 with the shaft 135 and will impart rotation to the control screw 63b and consequent longitudinal movement to a stylus member which is proportional to the angular movement of the pendulum.

It will be readily apparent that other mechanical means may be employed for operating the control screw, and it is again emphasized that the novelty of applicant's invention is believed to reside largely in the mechanism whereby a magnified movement may be imparted to a stylus member which is proportional to the angular movement of a plumb bob which includes the electrically controlled pendulum governing means.

Fig. 16 illustrates a preferred manner in which I propose to effect the recording method contemplated by my invention. In this figure the bore hole or a section of tubing carrying a clinograph is indicated at $a$. The distance $bc$ represents a predetermined length of drill string which may correspond to one strand or length of such string, ordinarily eighty-eight feet in length.

In common practice, as mentioned above, the measurements obtained correspond to the angles $dbf$ and $ebf$, from which it is necessary to calculate the latitude with respect to the perpendicular $bf$ (which may be represented by line $dc$ or $fe$) and the departure (which may be represented by line $ec$ or $fd$).

In the practice of the method contemplated by my invention, the readings on the chart 70 correspond to the distances $fe$ and $fd$ respectively, so that the only computations involved, necessary in obtaining a complete record of the well, are the addition and subtraction of the chart readings at the preselected points obtained from the various time intervals as mentioned above.

Briefly stated, this method comprises automatically recording upon a suitable chart the projected horizontal distances ($fd$ and $fe$) of points in a bore hole, corresponding to point $c$, from predetermined vertical planes of reference, which are defined by the triangles $bef$ and $bdf$ respectively. It will, of course, be understood that the point $d$ is the projection of point $c$ on plane $bdf$ and point $e$ is the projection of point $c$ on plane $bef$.

The vertical distance $bf$ will be readily determined because the recorded distances $fe$ and $fd$ will, in conjunction with the fixed or known distance, determine the angle $cbf$ and, consequently, the distance $bf$.

Attention is directed to the fact that it is not necessary that the planes $ebf$ and $dbf$ shall be at right angles to each other, but merely that their angle of intersection be fixed and known. The latitude and departure distances ($dc$ and $ec$ respectively) may then be plotted upon coordinate paper having axes intersecting at the same angle.

It is to be understood that, while I have herein described and illustrated one preferred form of my invention and indicated a modification thereof, the invention is not limited to the precise construction set forth, but includes within its scope whatever changes fairly come within the spirit of the appended claims.

I claim as my invention:

1. An apparatus for determining declination which embodies: a casing; gimbals mounted in said casing; pendulums supported by said gimbals; means for governing the movement of said pendulums in predetermined planes; stylus members associated with said governing means and adapted to move proportionately therewith in substantially parallel relation to the axis of said casing; and means engaged by said stylus members for receiving a record of the movement of said stylus members.

2. An apparatus for determining declination which embodies: a casing; a pendulum mounted in said casing and adapted to swing in two planes substantially at right angles to each other; means for governing the swinging movement of said pendulum in one plane; a movable stylus member mounted in said casing; means associated with said governing means for imparting movement to said stylus, such movement being proportional to the angular movement of said pendulum in one plane, and means engaged by said stylus members for receiving a record of the movement of said stylus.

3. An apparatus for determining declination embodying: a casing; a pendulum mounted therein and adapted to swing in two planes which are normal to each other; a recording stylus mounted in said casing and adapted to move longitudinally therein; means associated with said pendulum for moving said stylus proportionately to the angular movement of said pendulum in one plane; and means engaged by said stylus member for receiving a record of the movement of said stylus.

4. An apparatus for determining declination embodying: a casing; a pendulum mounted therein and adapted to swing in two planes which are normal to each other; a recording stylus mounted in said casing and adapted to move longitudinally therein; electrically controlled and operated means associated with said pendulum for moving said stylus proportionately to the angular movement of said pendulum in one plane; and means engaged by said stylus member for receiving a record of the movement of said stylus.

5. In an apparatus for determining declination: a casing; a pendulum mounted therein and adapted to swing about two axes which are normal to each other; a control gear in fixed relation with one of said axes; oppositely disposed contact members mounted on said pendulum; a contact bar mounted on said gear and having an extending portion between said contact members, said gear and said contact members being arranged so as to permit a slight swinging movement between said pendulum and said contact bar; a system of gears associated with said control gear; power means for operating said system of gears; and electrical means associated with said contact members for controlling the operation of said power means.

6. In an apparatus for determining declination: a casing; a pendulum mounted therein and adapted to swing about two axes which are normal to each other; a control gear in fixed relation with one of said axes; oppositely disposed contact members mounted on said pendulum; a contact bar mounted on said gear and having an extending portion between said contact members, said gear and said contact members being arranged so as to permit a slight swinging movement between said pendulum and said contact bar; a system of gears associated with said control gear; an electric motor for operating said system of gears; and electrical means associated with said contact members for controlling the operation of said electric motor.

7. In an apparatus for determining declination: a casing; a stylus mounted in said casing and adapted to move longitudinally therein; a screw for imparting movement to said stylus; a pendulum mounted in said casing and adapted to swing in two planes which are normal to each other; a control gear for governing the swinging movement of said pendulum in one plane; a system of gears for cooperatively moving said screw with said control gear; power means for operating said system of gears; and a traveling record sheet in engagement with said stylus.

8. In an apparatus for determining declination: a casing; a stylus mounted in said casing and adapted to move longitudinally therein; a screw for imparting movement to said stylus; a pendulum mounted in said casing and adapted to swing in two planes which are normal to each other; a control gear for governing the swinging movement of said pendulum in one plane; a system of gears for cooperatively moving said screw with said control gear; power means for operating said system of gears; electrical means including contact members on said pendulum and a contact bar on said control gear adapted to engage said contact members for controlling the operation of said power means; and a traveling record sheet in engagement with said stylus.

9. In an apparatus for determining declination: a casing; a pendulum mounted in said casing and adapted to swing in two planes which are normal to each other; oppositely disposed contact members mounted on said pendulum in one of said planes; a controle member mounted above said pendulum on an axis thereof and in the plane of said contact members; a contact bar rigidly mounted on said control member and having an extending portion between said contact members; electrically controlled means operated by the engagement of one of said contact members with said contact bar for moving said contact bar away from the engaged contact member; a stylus member; a traveling record sheet in engagement with said stylus member; and means for moving said stylus member and said control member during the movement of said control bar.

10. In an apparatus for determining declination: a casing; a pendulum mounted in said casing and adapted to swing in two planes which are normal to each other; oppositely disposed contact members mounted on said pendulum in one of said planes; a control member mounted above said pendulum on an axis thereof and in the plane of said contact members; a contact bar rigidly mounted on said control member and having an extending portion between said contact members; electrically controlled means operated by the engagement of one of said contact members with said contact bar for moving said contact bar away from the engaged contact member; a stylus member mounted in said casing and adapted to move longitudinally therein; a traveling record sheet in engagement with said stylus member; and means for moving said stylus member and said control member during the movement of said contact bar.

11. In an apparatus for determining declination: a casing; a pendulum mounted in said casing and adapted to swing in two planes which are normal to each other; oppositely disposed contact members mounted on said pendulum in one of said planes; a control member mounted above said pendulum on an axis thereof and in the plane of said contact members; a contact bar rigidly mounted on said control member and having an extending portion between said contact members; electrically controlled means operated by the engagement of one of said contact members with said contact bar for moving said contact bar away from the engaged contact member; a stylus member; a traveling record sheet in engagement with said stylus member and means comprising a rotatable screw mounted longitudinally in said casing and gears interposed between said screw and said control member for moving said stylus member and said control member during the movement of said contact bar.

12. In an apparatus for determining declination: a casing; a pendulum mounted in said casing and adapted to swing in two planes which are normal to each other, said pendulum being provided with an axial passage; oppositely disposed contact members mounted in said pendulum at the lower end of said passage; a control member mounted above said pendulum on an axis thereof and in the plane of said contact members; a contact bar rigidly mounted on said control member and having an extending portion positioned between said contact members, electrically controlled means associated with said control member and operated by the engagement of one of said contact members with said contact bar for moving said contact bar away from the engaged contact member; and means associated with said control member for recording the swinging movement of said pendulum in the plane of said control member.

13. In an apparatus for determining declination: a casing; a pendulum mounted in said casing and adapted to swing in two planes which are normal to each other, said pendulum being provided with an axial passage; oppositely disposed contact members mounted in said pendulum at the lower end of said passage; a control member mounted above said pendulum on an axis thereof and in the plane of said contact members; a contact bar rigidly mounted on said control member and having an extending portion positioned between said contact members; electrically controlled means associated with said control member and operated by the engagement of one of said contact members with said contact bar for moving said contact bar away from the engaged contact member; a stylus member mounted in said casing and movable longitudinally therein; a traveling record strip mounted in said casing and adapted to be engaged by said stylus; and means operated in connection with said control member for moving said stylus member.

14. An apparatus for determining declination which embodies: a casing; a single record sheet in said casing; a plurality of pendulums mounted in said casing, each of which is adapted to swing in two planes which are normal to each other; the axes about which said pendulums swing being arranged in predetermined angular relation with each other; stylus members mounted in said casing movable longitudinally therein; and positioned so as to engage said record sheet; control means for governing the swinging movement of each of said pendulums in a single plane; and means associated with said control means for moving said stylus members proportionately to the swinging movement of said pendulums.

15. An apparatus for determining declination which embodies: a casing; a plurality of gimbals mounted in said casing; pendulums supported by said gimbals; means for governing the movement of said pendulums in predetermined angularly disposed planes; stylus members associated with said governing means and adapted to move proportionately therewith in substantially parallel relation to the axis of said casing; and a single traveling record sheet adapted to receive a record of the movement of all of said stylus members.

16. In an apparatus for determining declination: a casing; a pendulum mounted in said casing and adapted to swing in two planes which are normal to each other; oppositely disposed contact members mounted on said pendulums in one of said planes; a control member mounted above said pendulum on an axis thereof and in the plane of said contact members; a contact bar rigidly mounted on said control member and having an extending portion between said contact members; an electric motor operated by a flow of current established by the engagement of one of said contact members with said contact bar for moving said contact bar away from the engaged contact member; a stylus member operated by said motor; a traveling record sheet in engagement with said stylus member and said control member during the movement of said control bar.

17. In an apparatus for determining declination: a casing; a pendulum mounted in said casing and adapted to swing in two planes which are normal to each other; oppositely disposed contact members mounted on said pendulum in one of said planes; a control member mounted above said pendulum on a pivot axis thereof and in the plane of said contact members; a contact bar rigidly mounted on said control member and having an extending portion between said contact members; an electric motor operated by a flow of current established by the engagement of one of said contact members with said contact bar for moving said contact bar away from the engaged contact member; a stylus member operated by said motor; a traveling record sheet in engagement with said stylus member; and means for moving said stylus member and said control member during the movement of said control bar, the engagement of said contact bar with the other of said contact members being effective to reverse said motor.

In testimony whereof, I have hereunto set my hand at Los Angeles, California, this 8 day of June, 1929.

ROY P. McLAUGHLIN.